US008246068B2

(12) United States Patent
MacDougall

(10) Patent No.: US 8,246,068 B2
(45) Date of Patent: Aug. 21, 2012

(54) HIGHWAY AND DISPLAY SECURITY TRAILER

(76) Inventor: Kenneth L. MacDougall, Waverley (CA)

( * ) Notice: Subject to any disclaimer, the term of this patent is extended or adjusted under 35 U.S.C. 154(b) by 297 days.

(21) Appl. No.: 12/595,557

(22) PCT Filed: Apr. 8, 2008

(86) PCT No.: PCT/CA2008/000653
§ 371 (c)(1),
(2), (4) Date: Oct. 12, 2009

(87) PCT Pub. No.: WO2008/122124
PCT Pub. Date: Oct. 16, 2008

(65) Prior Publication Data

US 2010/0109287 A1 May 6, 2010

(30) Foreign Application Priority Data

Apr. 10, 2007 (CA) .................................... 2585677

(51) Int. Cl.
*B60D 1/54* (2006.01)

(52) U.S. Cl. .................... 280/491.1; 280/491.5; 40/590; 340/908

(58) Field of Classification Search .................. 340/908, 340/932.1; 40/590; 280/491.1, 491.3, 491.4, 280/491.5; 296/21
See application file for complete search history.

(56) References Cited

U.S. PATENT DOCUMENTS 3,622,980 A * 11/1971 Elledge, Jr. .................. 315/323
3,702,033 A 11/1972 Coleman
3,897,098 A * 7/1975 Haertig ...................... 294/81.41
4,087,785 A 5/1978 Dodich
4,273,352 A * 6/1981 Jorgenson ..................... 280/481
4,593,265 A 6/1986 McKenney
4,786,073 A * 11/1988 Harper .......................... 280/656
5,231,393 A * 7/1993 Strickland ..................... 340/936
6,254,117 B1 * 7/2001 Cross ........................... 280/401
6,659,496 B1 * 12/2003 Wilson .......................... 280/656
7,365,640 B2 * 4/2008 Garcia .......................... 340/431
2006/0055558 A1 * 3/2006 Rohl ............................. 340/907
2006/0279071 A1 * 12/2006 Spainhower ................. 280/656
2009/0322060 A1 12/2009 Macdougall

FOREIGN PATENT DOCUMENTS

CA 2460262 A1 9/2005

* cited by examiner

*Primary Examiner* — Lesley D Morris
*Assistant Examiner* — Maurice Williams
(74) *Attorney, Agent, or Firm* — Brooks Kushman P.C.

(57) ABSTRACT

The present invention provides a trailer to transport materials or equipment, the front tongue assembly of which converts to a highway traffic arrow board, or other preferred display, and which locks the trailer securely in place. The tongue extension frame extends through and pivots on the trailer frame and is moved to vertical by rack and pinion, or other suitable means such as hydraulic cylinder. Its upper end pivotably supports a Y-shaped tongue assembly with sign affixed opposite the towbar and hitch means. Power is applied to a gear box mounted on upper end of said tongue extension frame which turns the pivot bar 180 degrees to place the sign at the top for display and the towbar with hitch means at the bottom. Flip-down legs with extended side supports give added stability in the setup positions.

8 Claims, 5 Drawing Sheets

HIGHWAY AND DISPLAY SECURITY TRAILER

FIELD OF THE INVENTION

The present invention relates to a towable apparatus for transporting and displaying highway traffic control signs, radar speed indicators or any type of sign, as well as transporting equipment and materials.

BACKGROUND OF THE INVENTION

Conventional highway traffic control signs generally have a high configuration with limited additional utility apart from that specific purpose. When left unattended, trailers with expensive display boards and equipment are often jacked up and all wheels removed for security purposes. Most make no adequate provision for work site, or storage yard security, making them prime targets for theft. Some have pivoting top sections that are awkward to raise and lower, and others have sign or arrow boards that cannot be lowered, presenting an additional hazard in high wind conditions, and which also require storage buildings with sufficient height provisions.

The present invention evolved from a previous Canadian patent application No. 2,460,262 MULTIPLE USE ADJUSTABLE SECURITY TRAILER FOR TRANSPORTATION, STORAGE AND HOUSING, by the same inventor and seeks to address new claims not covered in that application, which relate specifically to this new design for highway sign trailers.

SUMMARY OF THE INVENTION

The present invention overcomes the problems of the prior art designs by providing a dual use and multiple featured trailer which can be utilized for transporting and displaying highway traffic control or other types of signs, and carrying equipment and materials.

It is an object of the present invention to provide a trailer, the front tongue sections of which easily convert from a transportation mode to a highway display sign configuration.

Another object of the present invention is to reduce the number of vehicles required at a work site by combining an equipment and supplies carrier and highway sign trailer into one compact vehicle.

It is also an object of the present invention to provide a highway sign trailer with a comparatively low profile, when in the travelling or housing mode.

Another object of the present invention provides a trailer that may be securely locked in place in either the primary setup or secondary setup/display mode.

Another object of the present invention is to provide a trailer that may be used for display of various types of signs or other objects.

A further object of the present invention is to provide a trailer that may be of minimum length and width, housing only essentials for display sign purposes, such as radar speed control monitors, or it may be of significant dimensions to also house equipment and supplies, such as generators, solar panels, battery packs, pumps, barricades, stacking marker cones, tools, et cetera.

Accordingly, the present invention provides a towable trailer for displaying highway or other signs and transporting and storing equipment or materials, comprising a wheel-mounted trailer frame; a substantially "Y" shaped tongue, with a rear cross member supporting a highway sign positioned opposite the hitch means, the side arms of which are pivotably mounted on sides of a tongue extension frame, and aligned with hitch pins; the rear ends of said tongue extension frame are pivotably mounted to each side of the trailer frame; a horizontal reinforcing member, with side braces, is fixed between the two sides of the tongue extension frame to provide support; a pair of extended flip-down legs with wide support foot sections are affixed one each side of the trailer frame and are proportioned to contact the ground surface when in the flip-down position giving support to the trailer; said tongue extension frame being pivotable between a lowered position for transport of the trailer and vertical secured position for display or security purposes; whereby, in the lowered position, said forward hitch means is connectable to a towing vehicle, and while in the vertical position, lower portions of said tongue extension frame are capable of contacting a ground surface to support the trailer for display of signs or housing materials or equipment thereon.

Another aspect of the present invention provides a method of converting the trailer from a transportation mode into a display/security mode, wherein the hitch pin inserted in the left extended flip-down leg, is removed enabling the leg to pivot downward into a vertical position about the pivot means, thereby contacting the ground and vertically supporting the trailer frame; the front tow bar with forward hitch means is disconnected from the two vehicle; the hitch pin inserted in the right extended flip-down leg hitch means, is removed, enabling the leg to pivot downward into a vertical position about the pivot means thereby contacting the ground and vertically also supporting the frame; the front towbar of the tongue is pivoted upward and the lower portions of the side tongue extension frame are pivoted downward about the pivot means into a vertical position each having a ground engaging foot plate, which, with the extended flip down-legs, provide a ground base to support the trailer and tongue extension frame; the sides of the vertically positioned tongue extension frame are secured in the fully vertical position by inserting a hitch pin or locking device in aligned holes in brackets positioned on the trailer frame and a side of the tongue extension frame. Another aspect of the present invention provides a method of raising the tongue extension frame, with the "Y" shaped towbar assembly attached, to the vertical and returning it to the horizontal position; wherein a curved rack, or other suitable device, is securely fastened to the upper side of the lower end of the left side tongue extension frame and moves through an opening provided at the top, or alongside of the trailer frame and is moved in preferred directions by a pinion located in a mounted gear box, and may be powered manually or otherwise.

Another aspect of the present invention provides a method of converting a trailer vehicle from a transporting mode to a static sign display mode, wherein the vehicle has a wheel-mounted trailer frame with side members and with tow bar tongue means having a front end with a coupler hitch for connection to a towing vehicle, and pivot means connecting the tow bar tongue means to the frame side members and means for temporarily securing the tongue means relative to the trailer frame in a first, generally horizontal position and in a second generally vertical position, a sign carried by said tow bar tongue means and aligned therewith so as to be generally horizontal when the trailer vehicle is connected to the towing vehicle and to be generally vertical when the tongue is raised to its second position, and having leg means attached to a front part of the trailer frame so as to support the frame when the tongue is disconnected from the towing vehicle; comprising the steps of moving the leg means to support the front of the trailer, releasing the coupler hitch from the towing vehicle, releasing the means for temporarily securing the tongue means to the frame and raising the tongue means into a vertical position to display the sign in a vertical position.

The present invention also provides for rotation of the sign support frame in either direction so as to display the sign in a forward or backward position.

Additional objects and advantages will become apparent from a careful reading of the detailed description provided herein, with appropriate references to the accompanying drawings.

BRIEF DESCRIPTION OF THE DRAWINGS

Embodiments of the invention will be described below with reference to the accompanying drawings, in which.

DETAILED DESCRIPTION OF THE PREFERRED EMBODIMENTS

Figure 1:
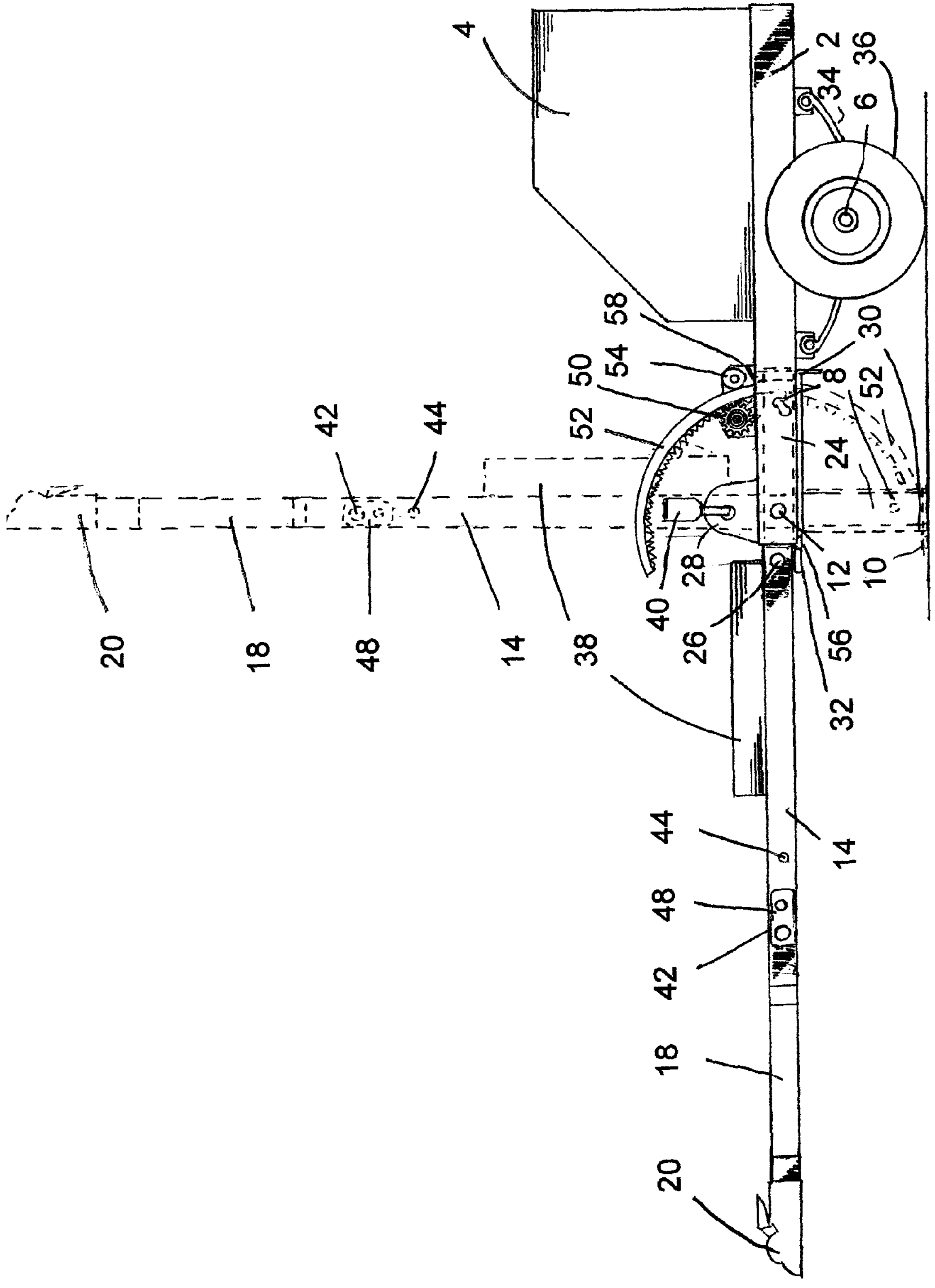
FIG. 1 is a left side view of a trailer with a highway display sign according to one embodiment of the present invention in its transportation mode and view of its display/locking mode.
Figure 2:
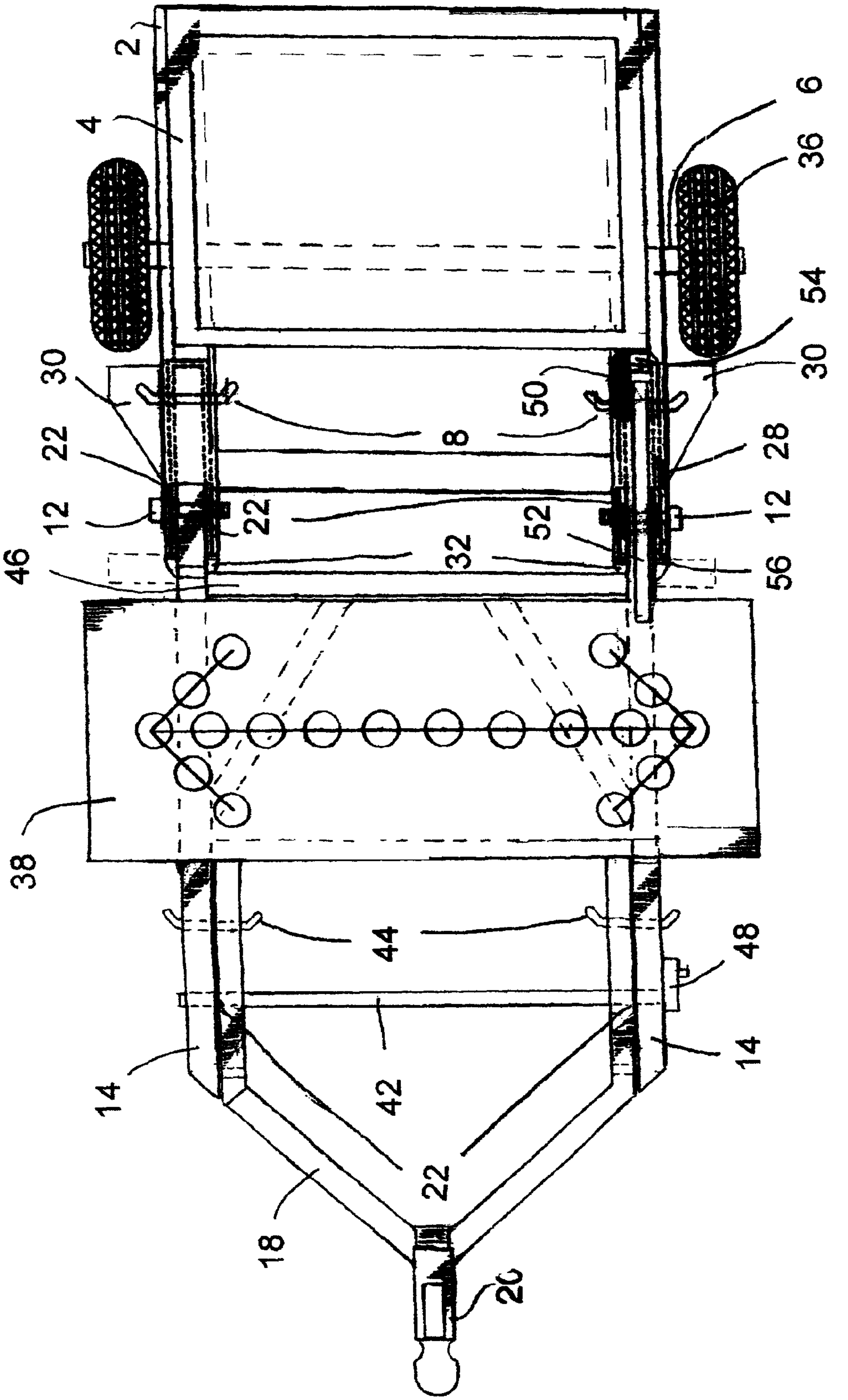
FIG. 2 is a top view of a trailer transporting a highway display sign in its transportation mode.
Figure 3:
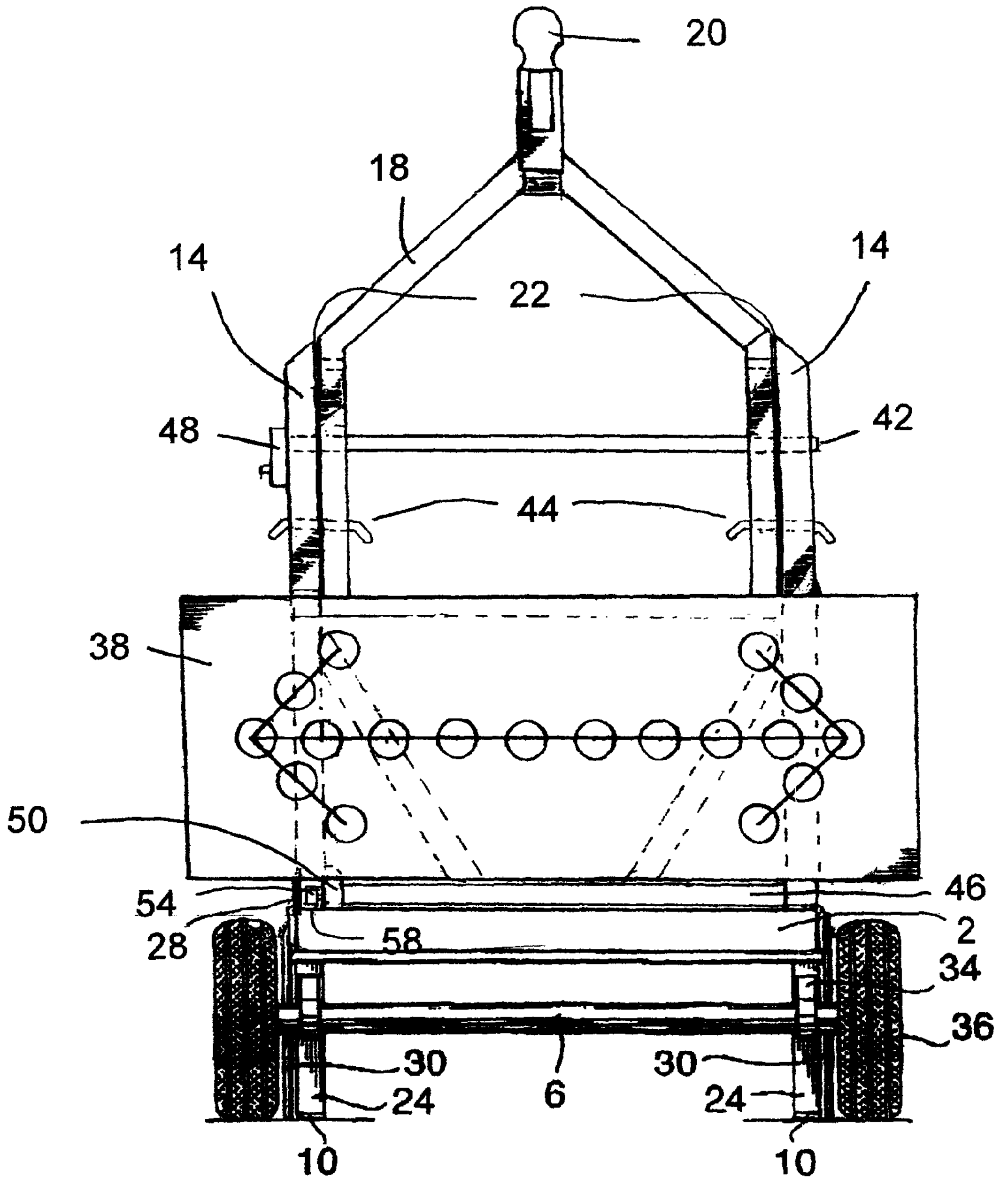
FIG. 3 is a rear end view of a trailer with a highway display sign in its primary setup and locking position.
Figure 4:
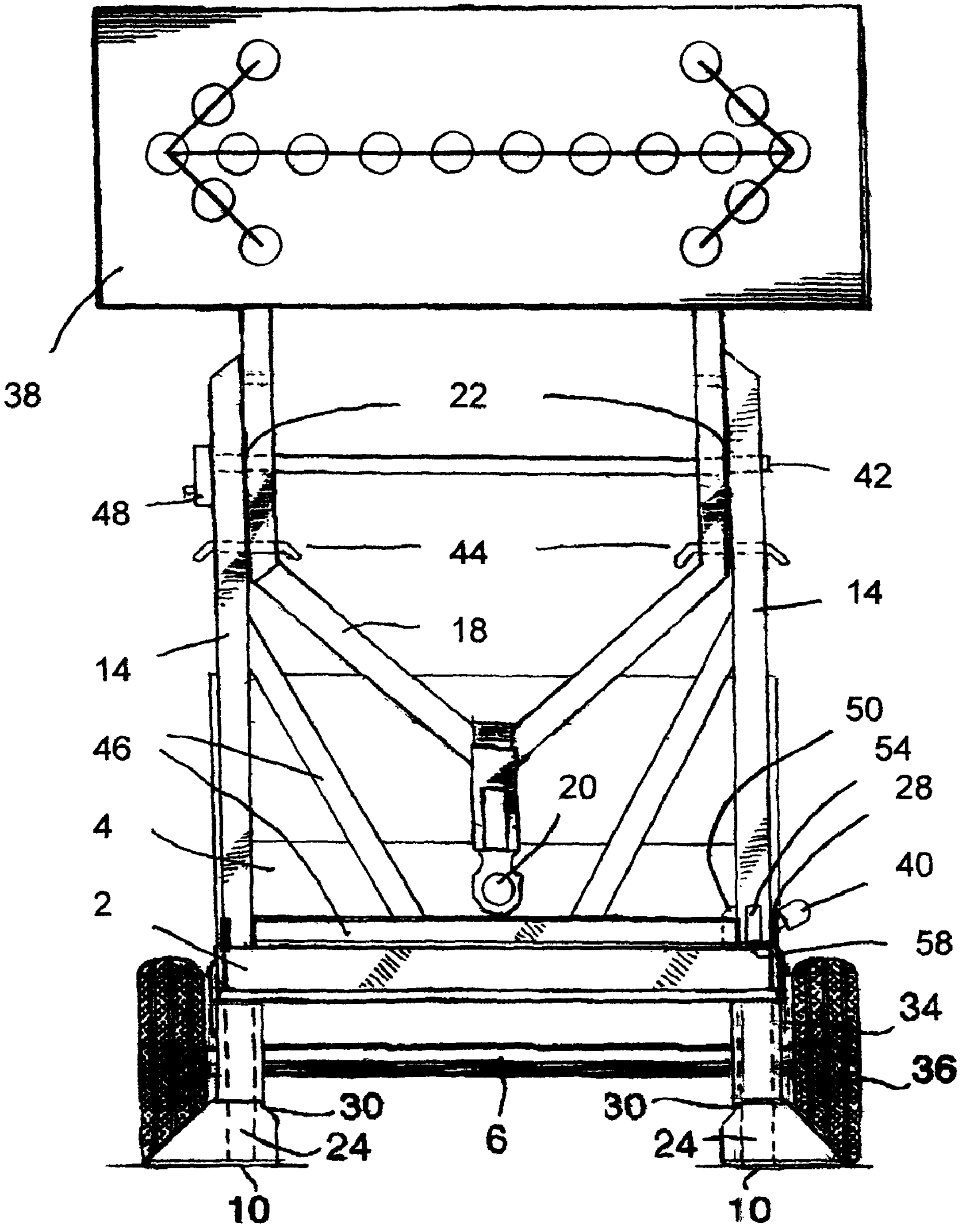
FIG. 4 is a front end view of a trailer with a highway display sign in its secondary setup/display and locking position.

Referring to FIGS. 1, 2, and 3, a trailer wherein the rear portion of the frame (2) consists of a connector cross beam attached perpendicularly to the side of the frame at both ends in the same plane to create a stable rectangular frame supported by springs (34) axle (6) and tires (36) and which supports rails or a box (4) of a desired size and capacity. A trailer wherein a tongue extension frame (14) has two side arms which insert into a rear rectangular trailer frame (2) where they are secured while the trailer is in transportation mode, by a pivot pin (12) in a pivot means, with spacing washers (22) and by a hitch pin (8) in a hitch means. A horizontal reinforcing member (46) with supporting side braces is fixed between the two sides of said frame. Each side of the tongue extension frame has holes capable of inserting the pivot pin (12) and the hitch pin (8) and extending forward to support a pivot bar (42) which pivotably supports a "Y" shaped tongue (18). The tongue consists of a front tow bar and two side arms, each of which extends outward and to the rear in the same plane with the front tow bar. A female trailer coupler hitch (20) is affixed at the front tow bar to permit a towing vehicle to attach with a complimentary male trailer coupler hitch and tow the trailer while it is in transportation mode. The Y-shaped tongue (18) has a rectangular hollow cross-section throughout and is constructed of metal or other suitable material. In the transportation mode, the rear portion of each side arm has a hole capable of inserting a pivot bar (42) and with spacer washers (22) is secured in an aligned position with said tongue extension frame (14) by the forward hitch pins (44) in a hitch means. The Y-shaped tongue (18) has a rear support member opposite the hitch means (20) to which is secured a highway, or other desired display sign (38).

Referring now to FIG. 1, a reinforcing angle bar (56) with attached handle (32) is installed at the lower front corner on each side of the trailer frame forward of the pivot pin (12). While the trailer is in transportation mode, the flip-down leg (30) is affixed to each side of the frame (2) at the pivot means and at the flip-down hitch means. At the pivot means, a pivot pin (12) is inserted into a hole aligned in the exterior wall of the trailer frame, through a washer (22) an upper exterior part of the flip-down leg (30), a second washer, the exterior side wall of the tongue extension frame (14), the interior wall of the same frame, a third washer, the interior wall of the flip-down leg, a fourth washer and an interior wall of the side of the trailer frame and is secured with a fastener, such as a locknut. At the flip-down hitch means, a hitch pin (8) is inserted through a hole aligned through an exterior rearward wall of the side of the frame (2) an exterior side of the flip-down leg (30), an exterior wall of the tongue extension frame (14), an interior wall of that same frame, an interior wall of the flip-down leg, and an interior wall of the side of the frame (2) and is secured with a suitable fastening method.

The tongue extension (14) is pivoted about the pivot pin (12) to the vertical position by means of a hydraulic cylinder or a curved rack (52) which is secured to the lower end of tongue extension frame (24) and passes up through, or alongside an opening, in the trailer frame (58) where it is engaged and driven by a pinion located in a gear assembly (50), guided by a roller bearing (54), and powered manually or otherwise. Turning gear assembly (50) clockwise pushes the curved rack (52), attached to the lower end of the support leg (24), down through open bottom section (16) to the vertical position, and counterclockwise rotation returns it back upward to its travelling position within the trailer frame (2), where it may be secured, along with the flip-down leg, (30) by a hitch pin (8).

The trailer can be converted from transportation mode to display/locking mode as follows:

1) while the coupler hitch (20) is attached to the towing vehicle, remove left side trailer hitch pin (8) and push extended flip-down leg (30) to the vertical position;
2) detach coupler from vehicle and rest forward section of trailer on that leg;
3) remove right side hitch pin (8);
4) a hydraulic cylinder may be used or power applied to gear box (50) which turns a pinion forcing curved rack (52) downward, through an opening (58) in the top, or alongside of trailer frame (2) and guided by roller bearing (54) causing lower section (24) of tongue extension frame (14) to pivot downward about the pivot means (12) so that foot plate (10) engages the ground giving support to the trailer and tongue extension frame in the vertical primary setup/locking position;
5) insert a locking, or other device (40) through aligned holes on tongue extension frame bracket (26) and trailer frame bracket (28);
6) forward hitch pins (44) of tongue extension frame (14) are removed to allow the Y-shaped tongue (18) with washers (22) to pivot on pivot bar (42);
7) a preferred power source is applied to gear box (48) which rotates pivot bar (42) in a counter-clockwise direction, 180 degrees so that hitch means (20) of Y-shaped tongue (18) is in the vertical downward position, arid highway display, or other sign (38) is in the vertical secondary setup/display and locking position;
8) hitch pins which may be the locking variety (44) are inserted in holes in tongue extension frame (14) from which they were removed, passing through holes provided in the Y-shaped tongue (18) side members as required, thus securing the sign (38) in the vertical secondary setup and locking position;
9) all procedures are reversed to restore the components of the trailer to its original transportation position.

Figure 5:
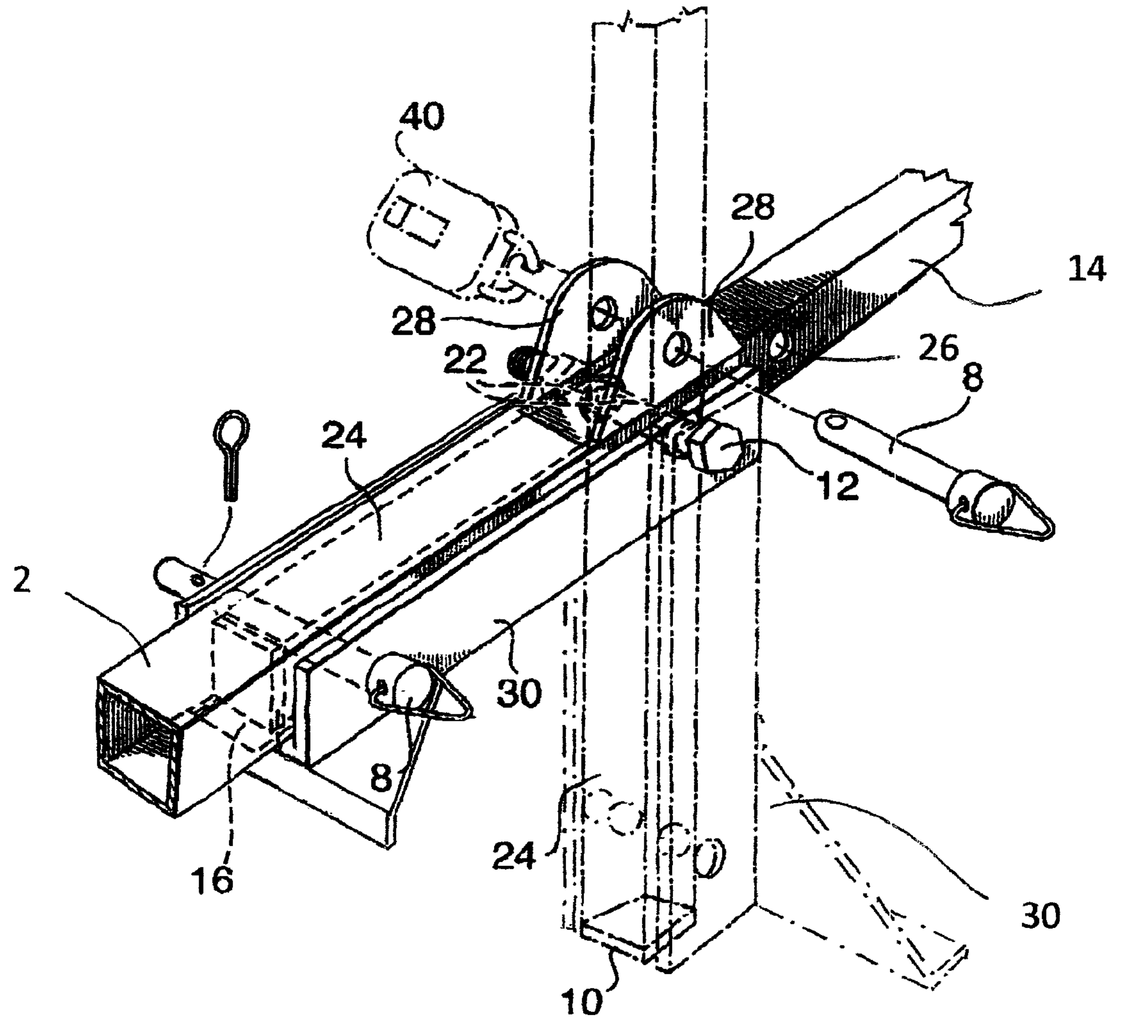
FIG. 5 is a magnified view of a right side pivot means of a trailer frame.

Referring now to FIG. 5 wherein a detailed illustration depicts a right side hitch means and a pivot means (12) for the tongue extension frame (14) with locking brackets (28), vertical hitch means (26), securing hitch pin (8) and locking device (40) of a trailer, including the flip-down leg (30) in a travelling position secured by hitch pin (8) and a view in its vertical position where the extended lower section provides additional lateral support for the trailer in the secondary setup and locking position. The flip-down leg also may be configured to pivot up inside the frame (2) through open bottom (16) utilizing spacing washers (22) and be secured in a similar fashion. In the vertical position the lower end of tongue extension frame (24) may be conjoined, for added stability, with the flip-down leg utilizing a hitch pin and aligned hitch means near foot plate (10).

While the present invention has been described with particular reference to the preferred embodiments, the protection sought is to be limited only by the terms of the claims that follow.

The embodiments of the invention in which an exclusive property or privilege is claimed are defined as follows:

1. A trailer for transporting and displaying signs including highway traffic control signs and speed indicators, the trailer comprising:

an elongate wheel-mounted trailer having a trailer frame with a forward end and a rearward end;

an extension frame having a first end, a second end, and a first pivot axis intermediate the first and second ends, the extension frame pivotally connected to the forward end of trailer frame at the first pivot axis, the extension frame being moveable between a generally horizontal tow position aligned with the trailer frame and an upright erect position generally perpendicular to the trailer frame, the first end of the extension frame defining a foot portion for contacting an underlying surface when the extension frame is in the erect position; and a tongue having a hitch end, a tail end, and a second pivot axis intermediate the hitch end and the tail end, the tongue pivotally connected to the second end of the extension frame at the second pivot axis, the tongue further including a sign disposed on the tail end, wherein pivoting of the tongue about the second pivot axis when the extension frame is in the erect position moves the traffic sign to a generally vertical position above the extension frame.

2. A trailer according to claim 1, wherein a pivot bar extends across side portions of the extension frame and along the pivot axis to enable pivoting of the tongue relative to the extension frame.

3. A trailer according to claim 1, including a flip-down leg attached to a front part of the trailer frame so as to support the frame when the hitch end is disconnected from a towing vehicle.

4. The trailer according to claim 3, wherein the foot portion extends further from the trailer frame than the flip-down leg when the extension frame is in the erect position.

5. A trailer according to claim 1, wherein the trailer frame and the extension frame are interconnected by a rack and pinion mechanism so that rotation of the pinion can raise the extension frame towards the second position.

6. The trailer according to claim 5, wherein the rack and pinion mechanism includes a curved rack mounted to the extension frame and a pinion mounted to the trailer frame.

7. The trailer according to claim 1, wherein the extension frame pivots about the forward end of the trailer frame about 90 degrees between the tow position and the erect position, and the tongue pivots about the pivot axis about 180 degrees.

8. The trailer according to claim 1, further comprising a trailer hitch affixed to the hitch end of the tongue so that in the tow position the hitch, the tongue, the extension frame, and the trailer frame are generally horizontally aligned.

* * * * *

UNITED STATES PATENT AND TRADEMARK OFFICE

CERTIFICATE OF CORRECTION

PATENT NO. : 8,246,068 B2
APPLICATION NO. : 12/595557
DATED : August 21, 2012
INVENTOR(S) : Kenneth L. MacDougall It is certified that error appears in the above-identified patent and that said Letters Patent is hereby corrected as shown below:

Column 5, Line 25-26, Claim 1:

After "forward end of"
Insert -- the --.

Signed and Sealed this
Twentieth Day of November, 2012

David J. Kappos
*Director of the United States Patent and Trademark Office*